United States Patent Office 2,942,978
Patented June 28, 1960

2,942,978

FOAMING BEVERAGES

Edward Segel and Edwin J. Wye, Chicago, Ill., assignors to J. E. Siebel Sons' Company, Inc., Chicago, Ill., a corporation of Illinois No Drawing. Filed Nov. 10, 1958, Ser. No. 772,671

7 Claims. (Cl. 99—48)

This invention relates to improvements in the character and life of foam in naturally or artificially carbonated foam-producing beverages.

In one specific embodiment this invention relates to improving the character and life of foam in carbonated alcoholic beverages derived from malt, such as beer, ale, and so-called "near-beer," all herein generically designated "beer."

In another specific embodiment the present invention relates to improving the character and life of foams normally produced by nonalcoholic soft drinks, such as root beer, cream soda, and the like carbonated sugar-containing or sugar-free carbonated beverages.

When a carbonated alcoholic malt beverage, as beer, is poured into a glass, a head of foam forms which gradually subsides. The rate at which such foam collapses depends not only on the temperature of the beer, the method of pouring, and other variables under control of the consumer, but also, most importantly, on the composition of the beer itself. If different beers are poured under exactly the same conditions, it will be found that their foams collapse at different rates.

The reason why the foams of different beers collapse at different rates is not completely understood. The size of the gas bubble is recognized as an important factor in foam life, as discussed by De Clerck and De Dycker in Proceedings of the European Brewery Convention, Copenhagen, pp. 43–50 (1957). A material which could be added to beer to reduce bubble size would be desirable, both to increase foam life and to make a more "creamy" foam.

Variation in foam life is found not only among different brands of beer, but in different batches of beer made by the same brewery. One of the aims of a brewery is to produce consistently a beer which gives a long-lasting head of foam. This goal is not easy to attain.

When a carbonated "soft drink" is poured into a glass, large bubbles form, which collapse quickly, leaving a "flat" appearing beverage.

Detergents have a harmful effect on beer foam, shortening foam life substantially. Since traces of detergents may be introduced inadvertently into beer, either as a residue from cleaning procedures in the brewery, or by incomplete rinsing of glasses used by the consumer, a material which would inhibit this harmful effect of detergents is highly desirable.

An object of this invention is to decrease bubble size and increase foam life of foam-producing carbonated non-alcoholic beverages and of beer.

Another object of this invention is to produce a beer more pleasing to the consumer, in that the head of foam formed when the beer is poured into a glass is creamier and collapses more slowly.

A further object of this invention is to provide a method for producing soft drinks with pleasing heads of foam.

Still another object is to produce a beer whose foam life is resistant to the deleterious effect of detergents.

Other objects of this invention will appear hereinafter.

We have discovered that high molecular weight polymers of ethylene oxide have a remarkable effect on the foam of supersaturated aqueous carbon dioxide solutions. By "high molecular weight polymers of ethylene oxide" or more simply "polyethylene oxide" we mean polymers of ethylene oxide in the approximate molecular weight range of from about two hundred thousand to about five million. These have a viscosity in the range from about 200 centipoises at 5% by weight concentration in water at 25° C. to about 5000 centipoises at 1% concentration, as measured by Brookfield viscosimeter RVF at 2 r.p.m. and largest spindle for desired scale.

The addition of such polymers to a super-saturated solution of carbon dioxide in water causes a surprising change in the behavior of the solution when it is poured into a glass.

Thus, for example, if a bottle of commercial "Sparkling Water" or "Club Soda," which is a solution of carbon dioxide in water (containing about 4.5 volumes of $CO_2$ per volume of water), is poured into a glass, large bubbles of carbon dioxide are released, which rapidly collapse, and no "head" of foam forms. If, however, 80 p.p.m. of polyethylene oxide is added to the solution before pouring, the bubbles formed are much smaller, and a desirable, "creamy" head of foam forms, which lasts an appreciable period of time.

This unexpected and profound effect of polyethylene oxide on supersaturated carbon dioxide solutions is not limited to sparkling waters. The foam of soft drinks in general is similarly benefited. Such diverse products as ginger ale, cream soda, and sugar-free black cherry soda show a marked improvement in foam characteristics by addition of polyethylene oxide. Even a comparatively slightly carbonated beverage—an orange soda containing 1.6 volumes of $CO_2$ per volume of beverage—showed a head of foam consisting of fine bubbles when polyethylene oxide was added.

The beneficial effect of polyethylene oxide on foam extends also to as complex a supersaturated solution of carbon dioxide in water as beer and related products (ale, "near-beer," etc.), which contain, in addition to many complex organic materials, ethyl alcohol up to about 5 percent by weight.

In beverages containing higher proportions of alcohol than that present in beer, such as champagne and sparkling wines, no improvement in foam life or bubble size by polyethylene oxide is noted. Apparently this is a direct consequence of alcohol content, since addition of approximately 10% by volume of alcohol to sparkling water eliminates foam improvement by polyethylene oxide.

The addition of polyethylene oxide to beer markedly lowers the bubble size, increases creaminess, and increases the time which elapses between pouring the beverage into a glass and the disappearance of the foam so formed. In a very general way, the higher the molecular weight of the polymer used, the greater is the increase in foam life.

To determine the increase in foam life of beer produced by polyethylene oxide, the rate of collapse of the head of foam on a glass of beer is measured under standardized conditions. Reproducible results are obtainable by control over the distance through which the beer falls when poured, the time required for pouring a standard volume, and the temperature of the beer when poured.

The effect of polyethylene oxide on beer is strikingly consistent. The degree of increase in foam like will in part depend on the polymer grade and its concentration, as well as to some extent on the particular beer or other beverage used. Consistent with the foregoing, one skilled in the art can readily select a polymer grade and concentration for a particular beverage which will give an increase large enough to be pleasing to the consumer, yet not so large as to give an unnatural looking foam.

A further advantage of polyethylene oxide is that it inhibits the deleterious effect of detergents on beer foam. Thus, while the foam of untreated beer is made markedly worse by such detergents as, for example, "Dreft," cetyl trimethyl ammonium bromide, or polyoxyethylene sorbitan monooleate ("Tween 80," manufactured by Atlas Powder Co.), a beer containing polyethylene oxide is not so affected.

The high molecular weight polyethylene oxide suitable for use in this invention may be made by polymerization of ethylene oxide, as for example by heating in the presence of alkaline earth carbonate catalysts, as described in Industrial and Engineering Chemistry, vol. 50, pp. 5–7, 1958.

This polymer is water soluble. It may be introduced either as an aqueous solution, or the solid may be dissolved directly in the beverage during manufacture.

Use of such a high molecular weight polymer of ethylene oxide does not impair the stability, taste, or brilliance of the beverage in which it is used.

For most purposes, the desired concentration of high molecular weight ethylene oxide polymer lies in the range of 40–160 parts per million. For special purposes, lower, such as about 20 p.p.m., or higher concentrations such as up to about 320 p.p.m. may be desirable. The most suitable combination of polymer grade and concentration can readily be determined by simple experiment, to obtain the desired result, as previously mentioned.

In the case of fermented beverages, while the polyethylene oxide may be added during fermentation or even to the wort prior to fermentation, we prefer to add it after the completion of fermentation, to avoid loss of material by adsorption or absorption by the yeast or other solid material. In the case of sugar-containing soft drinks, the polyethylene oxide can be dissolved in the sugar sirup before addition of carbonated water.

The following examples illustrate the use of high molecular weight polymers of ethylene oxide in carbonated beverages, but in no way limit the invention.

*Example I*

A 1.34% aqueous solution of a high molecular weight polyethylene oxide (viscosity of 1% solution of 3000 centipoises, Brookfield RVF viscometer, 2 r.p.m.) was added to a finished beer. The final concentration of the polymer was 80 p.p.m. This beer had a foam collapse time of 5 minutes and 42 seconds. The same beer under identical conditions but without the addition of polyethylene oxide had a collapse time of 4 minutes and 44 seconds.

*Example II*

A 1.34% aqueous solution of polyethylene oxide (viscosity of a 1% solution about 20 centipoises) was added to finished beer. The final concentration of the polymer was 80 p.p.m. This beer had a foam collapse time of 6 minutes and 23 seconds. The same beer under identical conditions but without the addition of polyethylene oxide had a collapse time of 5 minutes and 43 seconds.

*Example III*

Solid polyethylene oxide (viscosity of a 5% solution about 2000 centipoises) was added to a finished beer and allowed to dissolve. The concentration of the polymer was 120 p.p.m. This beer had a foam collapse time of 5 minutes and 38 seconds. The same beer under identical conditions but without the addition of polyethylene oxide had a collapse time of 4 minutes and 45 seconds.

*Example IV*

A 1.34% solution of polyethylene oxide (viscosity of a 1% solution about 3000 centipoises) was added to a finished beer. The final concentration of polymer in the beer was 80 p.p.m. This beer also contained 3 p.p.m. of a detergent ("Tween 80") known to destroy foam.

This beer had a foam collapse time of 5 minutes and 13 seconds. The same beer without ethylene oxide polymer but containing 3 p.p.m. of detergent had a foam collapse time of 4 minutes and 29 seconds. The same beer without ethylene oxide polymer and without detergent had a foam collapse time of 5 minutes and 4 seconds. It is thus evident that ethylene oxide polymer protects beer against the deleterious effect on foam of detergents.

*Example V*

A 1% solution of polyethylene oxide (viscosity of a 1% solution about 3000 centipoises) was added to root beer. The final concentration in root beer was 160 p.p.m.

The foam of the root beer containing polyethylene oxide lasted markedly longer than the same root beer not containing the polymer.

We claim:

1. The method of improving the character and life of foam-producing carbonated beverages having from 0 to about 5% ethanol content, which comprises dissolving therein high molecular weight polyethylene oxide.

2. The method of enhancing and prolonging the life of foam produced by beer which comprises dissolving high molecular weight polyethylene oxide in the beer.

3. The method of enhancing and prolonging the life of foam produced by carbonated nonalcoholic beverages which comprises dissolving high molecular weight polyethylene oxide in the beverage.

4. The method of enhancing and prolonging the life of foam produced by carbonated beverages having from 0 to about 5% ethanol content, and for counteracting the effect of foam-inhibiting detergent present, which comprises dissolving high molecular weight polyethylene oxide in said beverage.

5. A normally foam-producing carbonated beverage having from 0 to about 5% ethanol content, said beverage containing high molecular weight polyethylene oxide for prolonging the life of the foam.

6. Beer containing high molecular weight polyethylene oxide.

7. A carbonated nonalcoholic beverage containing high molecular weight polyethylene oxide.

References Cited in the file of this patent

UNITED STATES PATENTS 2,847,403    Contois _____ Aug. 12, 1958

UNITED STATES PATENT OFFICE

CERTIFICATE OF CORRECTION

Patent No. 2,942,978　　　　　　　　　　　　　　　June 28, 1960

Edward Segel et al.

It is hereby certified that error appears in the printed specification of the above numbered patent requiring correction and that the said Letters Patent should read as corrected below.

Column 2, line 68, for "like" read -- life --; column 3, line 36, for "formentation" read -- fermentation --; line 39, for "drings" read -- drinks --.

Signed and sealed this 6th day of December 1960.

(SEAL)
Attest:

KARL H. AXLINE　　　　　　　　　　　　　　　　　　ROBERT C. WATSON
Attesting Officer　　　　　　　　　　　　　　　　Commissioner of Patents